United States Patent [19]

Martens

[11] Patent Number: 4,749,854
[45] Date of Patent: Jun. 7, 1988

[54] APPARATUS FOR THE MEASUREMENT OF THE STRESS BIREFRINGENCE OF AN OPTICAL SENSOR

[75] Inventor: Gerhard Martens, Henstedt-Ulzburg, Fed. Rep. of Germany

[73] Assignee: U.S. Philips Corp., New York, N.Y.

[21] Appl. No.: 22,165

[22] Filed: Mar. 5, 1987

[30] Foreign Application Priority Data

Mar. 7, 1986 [DE] Fed. Rep. of Germany ....... 3607462

[51] Int. Cl.4 .......................... G02F 1/01; H01J 40/14
[52] U.S. Cl. .................................... 250/225; 356/365
[58] Field of Search ................ 250/225, 226; 356/365, 356/366, 367, 368

[56] References Cited

U.S. PATENT DOCUMENTS

| | | | |
|---|---|---|---|
| 3,401,590 | 9/1968 | Massey | 356/365 |
| 3,630,622 | 12/1971 | de Lang | 250/225 |
| 4,400,062 | 8/1983 | Mori et al. | 356/365 |
| 4,624,563 | 11/1986 | Johnson | 356/367 |

Primary Examiner—David C. Nelms
Assistant Examiner—William L. Oen
Attorney, Agent, or Firm—Thomas A. Briody; Jack E. Haken

[57] ABSTRACT

Apparatus for measurement of the stress birefringence of an optical sensor that is influenced by a quantity to be measured. An optical emitting device sends light of two adjacent wavelengths $\lambda_1$ and $\lambda_2$ through an emitting light guide and via a polariser and a retarder plate to the sensor. An analyser conducts mutually parallel polarization components of the light emerging from the sensor on a common path to a receiving and evaluating device which derives from the measured-value-dependent intensities of such polarization components information concerning the magnitude of the quantity to be measured. The thickness of the retarder plate is dimensioned to provide a path length w of the light through the retarder plate such that the two light components $\lambda_1$ and $\lambda_2$ that leave the analyzer are influenced in mutually opposite senses by the measured quantity via the sensor, so that they do not need to be separated by optical filters and combined again by a coupler.

4 Claims, 1 Drawing Sheet

APPARATUS FOR THE MEASUREMENT OF THE STRESS BIREFRINGENCE OF AN OPTICAL SENSOR

BACKGROUND OF THE INVENTION

1. Field of the Invention

The invention relates to an apparatus for the measurement of the stress birefringence of an optical sensor that is influenced by a quantity to be measured, comprising:

an optical emitting device for emitting light of two adjacent wavelengths $\lambda_1$ and $\lambda_2$, which device is optically connected to the sensor via an emitting light guide, a polariser and a retarder plate;

an analyser for the separation of the polarisation components of the light emerging from the sensor: and a receiving and evaluating device, which is optically connected to the analyser via a receiving light guide and which serves to derive from the measured-value-dependent intensities of the polarisation components information concerning the magnitude of the measured value.

2. Description of the Related Art

In an apparatus of this type known from West German patent DE-A-3,138,061 the retarder plate is a $\lambda/4$ plate, which circularly polarises the supplied, linearly polarised light. In the sensor, the orthogonal polarisation components are then influenced in opposite senses by the measured quantity. The displacement of the operating range, caused by the $\lambda/4$ plate, gives a higher sensitivity of measurement. In the known case, one polarisation component of the light of one wavelength and the polarisation component orthogonal thereto of the light of the other wavelength are evaluated. Only these two components, which leave the analyser in different directions and temporally displaced, are selected by appropriate filters and passed via a coupler to a commmon light guide leading to the receiving and evaluating device.

The required filters and couplers are costly components.

SUMMARY OF THE INVENTION

It is an object of the invention to provide an apparatus of the type described in the preamble, in which the expenditure for optical components is reduced.

To this end the apparatus according to the invention is characterized in that the thickness (d) of the retarder plate is selected in such a manner that the path length (w) of the light through the retarder plate is greater than the value $\lambda_1/\Delta n$, and the quotient of the values sin $(2\pi \cdot w\Delta n/\lambda_1)$ and sin $(2\pi \cdot w\Delta n/\lambda_2)$ is a negative number, $\Delta n$ being the specific birefringence of the material of the retarder plate, and in that the components of the two light portions of differing wavelength that leave the analyser in mutually parallel planes of polarisation are conducted into the common receiving light guide leading to the receiving and evaluating device.

The thickness d—dimensioned according to the invention in accordance with the required path length w—of the retarder plate forms on the one hand a positively and on the other hand a negatively retarding plate, for the polarisation components of the light of both wavelengths $\lambda_1$ and $\lambda_2$, which are measured in a common plane, so that the light components are influenced in mutually opposite senses by the measured quantity via the sensor. Since only these two components pass through the analyser on the same path, they do not need to be separated by optical filters and to be combined again by a coupler.

In order to achieve the object underlying the invention, a plurality of ranges of the thickness of the retarder plate are suitable, which ranges may, however, differ with regard to the attainable sensitivity. Naturally, the aim should be to select thicknesses which are as small as possible, In spite of small thickness, high sensitivities are attainable by arranging for the path length (w) to be smaller than the value.

$$\frac{\lambda_2 - 0.3\lambda_1}{\lambda_2 \cdot \lambda_1} \cdot \frac{\lambda_1}{\Delta n} \text{ (for } \lambda_2 > \lambda_1\text{)}$$

An advantageous further development of the invention, which permits particularly small thicknesses of the retarder plate and the saving of an additional analyser, is characterized in that the sensor comprises a mirror-coated end plane, which extends orthogonally to the beam direction and which reflects the entrance beam coaxially and directs it to the polariser, and in that light of the two wavelengths $\lambda_1$ and $\lambda_2$ which leaves the polariser in one of the planes of polarisation is coupled into the receiving light guide. In order to be able to compensate for measurement errors which may arise as a result of variations of the thickness of the retarder plate which are caused according to temperature, another feature of the invention is characterized in that a partial beam of the emitted beam is conducted past the sensor as reference beam to the receiving and evaluating device.

BRIEF DESCRIPTION OF THE DRAWINGS

The invention will be explained in greater detail, with reference to the accompanying drawings, wherein.

DESCRIPTION OF THE PREFERRED EMBODIMENTS

Figure 2:
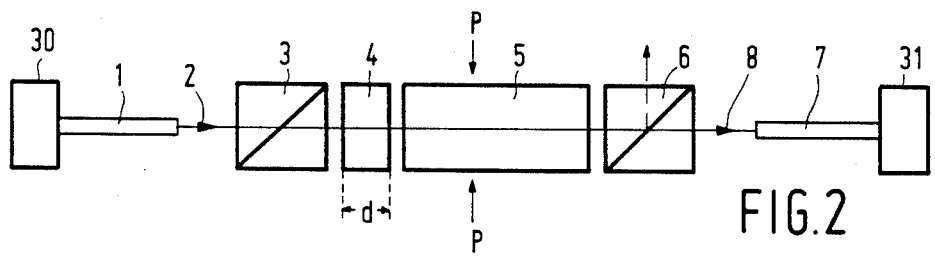
FIG. 2 shows an embodiment of a measurement apparatus according to the invention, with a sensor operated in the transmission mode

In the embodiment schematically shown in FIG. 2, light of two adjacent wavelengths $\lambda_1$ and $\lambda_2$ is conducted from a light source 30 via the emitting light guide 1 in direction 2 through the polariser 3. Light then penetrates into the retarder plate 4, said light being linearly polarised in a plane which is situated between the planes of the principal axes of the retarder plate 4. As a result of this, there appears at the exit of the retarder plate 4 circularly or at least elliptically polarised light, whose orthogonal polarisation components—which are separable by means of an analyser—are dependent upon the retardation of the retarder plate 4 and thus upon its thickness d. In FIG. 2, the thickness d of the retarder plate 4 is equal to the path length w of the light beam in the retarder plate.

As a result of a pressure P, which acts on the sensor 5 and which is to be measured, the sensor 5 acquires birefringent properties and influences the polarisation components of the light leaving the retarder plate 4 in a pressure-dependent manner. The analyser 6 conducts mutually parallel components of the light of the two wavelengths $\lambda_1$ and $\lambda_2$ on a common path (arrow 8) into the receiving light guide 7, which leads to a receiving and evaluating device 31.

Figure 3:
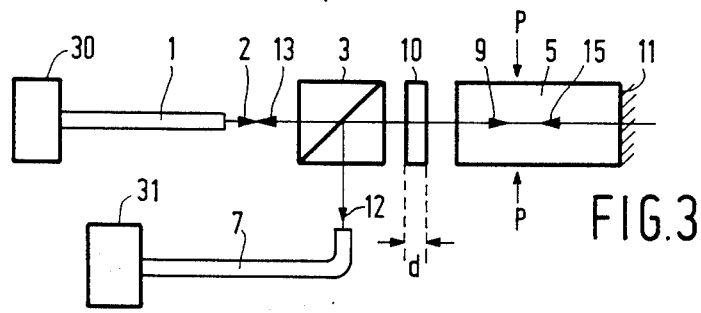
FIG. 3 shows a modified embodiment, with a sensor operated in the reflection mode.
Figure 4:
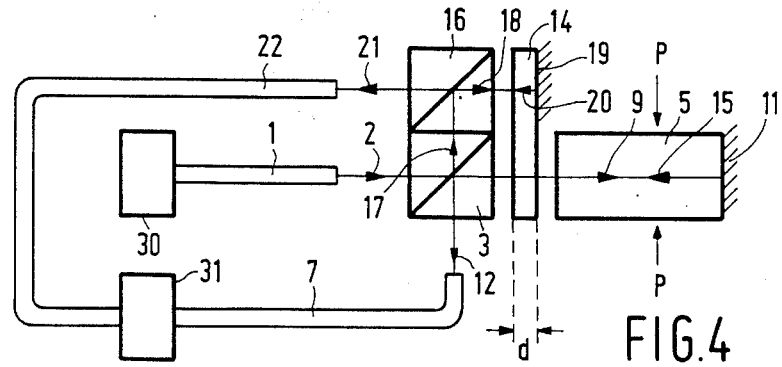
FIG. 4 shows an embodiment according to FIG. 3, in which, in addition, a reference measurement arrangement for temperature compensation is provided.

In FIGS. 2 to 4, optical devices such as objectives, spherical lenses or SELFOC lenses have not been shown, in order to simplify the representation. These devices are required on the one hand to collimate the light emerging from a light guide so as to form a parallel beam, and on the other hand to couple the light emerging from the analyser into the receiving light guide 7.

In the embodiment according to FIG. 3, the linearly polarised emitted beam is conducted in the direction of the arrow 9 through the retarder plate 10 and the sensor 5 It is reflected by the mirror-coated surface 11, of the sensor 5, which surface is orthogonal to the beam direction, and passes once again coaxially (arrow 15) through the sensor 5 and the retarder plate 10. Mutually parallel polarisation components of the light of both wavelengths $\lambda_1$ and $\lambda_2$ are conducted, by the polariser 3 acting at the same time as analyser, in the direction of the arrow 12 into the receiving light guide 7 and polarisation components polarised in a plane perpendicular thereto are conducted back into the emitting fibre 1 in the direction of the arrow 13. In order to obtain information on the stress-dependent birefringence of the sensor 5, both the polarisation components conducted via the receiving light guide 7 and also those conducted back via the emitting light guide 1 can be evaluated. Thus, it is possible to dispense with the receiving light guide 7. In the embodiments shown in FIGS. 3 and 4, having sensors 5 comprising a mirror-coated surface 11, the thicknesses d of the retarder plates 10 and 14 respectively are only half as great as that of the plate 4 according to FIG. 2 ($d=w/2$).

Since the retarder plates 4, 10 and 14, in particular in the case of closely adjacent wavelengths $\lambda_1$ and $\lambda_2$, are relatively thick as compared with a single $\lambda/4$ plate, variations of the dimensions caused by temperature fluctuations can have a relatively great effect. FIG. 4 shows an advantageous possibility for detecting variations of the thickness d of a retarder plate 14 which are caused by temperature. In this embodiment, as compared with the embodiment according to FIG. 3, a polarising divider 16 is additionally provided that guides a part of the the emitted beam—deflected by the polariser 3 in the direction of the arrow 17—in the direction of the arrow 18 through the upper region of the retarder plate 14 to the reflecting surface 19 and back in the direction of the arrows 20 and 21 into the reference light guide 22. The light thus passsng into the receiving and evaluating device 31 contains information on the variation of the thickness of the retarder plate 14 which is caused by temperature. On this basis, a compensation of measurement errors caused by temperature is possible.

Figure 1:
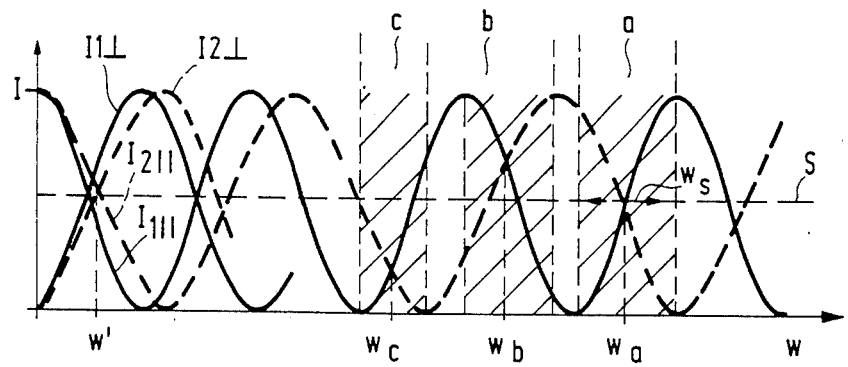
FIG. 1 shows intensity curves of the selected polarisation components, as a function of the path length through the retarder plate.

The mode of action of the relatively thick retarder plates 4, 10 and 14 will be explained in greater detail with reference to the characteristic curves shown in FIG. 1. In that figure, the light intensities I of the various polarisation components which are measurable at the exit of the retarder plates 4, 10 or 14 are plotted as a function of the path length w. The index $\parallel$ designates the polarisation components which are, by means of an analyser, measurable parallel to the original plane of polarisation, and the index $\perp$ designates those which are measurable in a plane perpendicular thereto. The indices 1 and 2 identify the pertinent wavelengths $\lambda_1$ and $\lambda_2$ of the emitted light.

With reference to a line s, the characteristic curves $I_{1\perp}$ and $I_{2\perp}$ respectively extend in a mirror-image configuration with respect to the characteristic curves $I_{1\parallel}$ and $I_{2\parallel}$ respectively.

The path length w' would be obtained, in the case of the application of a $\lambda/4$ plate, as in the case known from DE-A-3,138,061. In that case, proceeding from the operating point with the distance w', the sensor causes an enlargement or diminution of the resulting distances, the values $I_{1\parallel}$ and $I_{2\perp}$ varying in opposite senses, so that the sensitivity of measurement is relatively large.

However, according to the present invention, it it not two orthogonal polarisation components which are evaluated, but two parallel components of the various wavelengths $\lambda_1$ and $\lambda_2$. It is alternatively possible to evaluate either the components $I_{1\perp}$ and $I_{2\perp}$ or the components $I_{1\parallel}$ and $I_{2\parallel}$. Only the last mentioned case is explained with reference to FIG. 1.

It is seen that the components $I_{1\parallel}$ and $I_{2\parallel}$ are retarded differently, according to the different wavelengths $\lambda_1$ and $\lambda_2$. In the case of distances w which are substantially greater than w', that is to say in the case of appropriately large thicknesses d of a retarder plate, regions a, b and c arise, in which the intensities of the parallel polarisation components of the wavelengths $\lambda_1$ and $\lambda_2$ vary in opposite directions. At a distance $w_a$, the greatest measurement range with the greatest possible sensitivity is obtained in the case of negatively or positively added displacement distances $w_s$ of the sensor. This is the case when the point of intersection of the characteristic curves $I_{1\parallel}$ and $I_{2\parallel}$ is situated as close as possible to the line of symmetry s. Nevertheless, it can be expedient, for the reduction of measurement errors caused by temperature, to select smaller distances $w_b$ or $w_c$, tolerating a reduction of the sensitivity of measurement.

For the hatched regions a, b and c, the signs of sin ($2\pi.w.\Delta n/\lambda_1$) and sin ($2\pi.w.\Delta n/\lambda_2$) are different. $\Delta n$ is the specific birefringence of the material of the retarder plate, which, in the case of wavelengths $\lambda_1$ and $\lambda_2$ which are relatively closely adjacent to one another, is practically independent of the wavelength.

For $\lambda_2 > \lambda_1$, useful ranges a, b and c are situated in the range $$w < \frac{\lambda_2 - 0.3 \lambda_1}{\lambda_2 - \lambda_1} \cdot \frac{\lambda_1}{\Delta n} ,$$

Greater sensitivities are obtained if the distance w is large, and smaller temperature sensitivities if the distance w is small.

I claim:

1. An apparatus for the measurement of the stress birefringence of an optical sensor that is influenced by a quantity to be measured, comprising;
 an optical emitting device for emitting light of two adjacent wavelengths $\lambda_1$ and $\lambda_2$, which device is optically connected to the sensor via an emitting light guide, a polariser and a retarder plate;
 an analyser for the separation of the polarisation components of the light emerging from the sensor; and
 a receiving and evaluating device, which is optically connected to the analyser via a receiving light guide and which serves to derive from the measured-value-dependent intensities of the polarisation components information concerning the magnitude of the measured value, characterized in that the thickness (d) of the retarder plate is such that the path length (w) of the light through the retarder plate is greater than the value $\lambda_1/\Delta n$, and the quotient of the values $\sin(2\pi \cdot w \cdot \Delta n/\lambda_1)$ and $\sin(2\pi \cdot w \cdot \Delta n/\lambda_2)$ is a negative number, $\Delta n$ being the specific birefringence of the material of the retarder plate, and in that the components of the two light portions of differing wavelength that leave the analyser in mutually parallel planes of polarisation are conducted into the common receiving light guide leading to the receiving and evaluating device.

2. A device as claimed in claim 1, characterized in that the path length (w) is smaller than the value $$\frac{\lambda_2 - 0{,}3\,\lambda_1}{\lambda_2 - \lambda_1} \cdot \frac{\lambda_1}{\Delta n} \text{ (for } \lambda_2 > \lambda_1\text{)}$$

3. A device as claimed in any of claims 1 or 2, characterized in that the sensor comprises a mirror-coated end plane, which extends orthogonally to the beam direction and which reflects the emitted beam coaxially and directs it to the polariser, and in that light of the two wavelengths $\lambda_1$ and $\lambda_2$ which leaves the polariser in one of the planes of polarisation is coupled into the receiving light guide.

4. A device as claimed in any one of claims 1 to 3, characterized in that a partial beam of the emitted beam is conducted past the sensor as reference beam to the receiving and evaluating device.

* * * * *